United States Patent
Wentink

(10) Patent No.: US 9,819,770 B2
(45) Date of Patent: Nov. 14, 2017

(54) LEGACY-COMPATIBLE CONTROL FRAMES

(71) Applicant: QUALCOMM Incorporated, San Diego, CA (US)

(72) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/562,644

(22) Filed: Dec. 5, 2014

(65) Prior Publication Data

US 2015/0131530 A1    May 14, 2015

Related U.S. Application Data

(63) Continuation of application No. 14/316,734, filed on Jun. 26, 2014, which is a continuation of application No. 13/245,555, filed on Sep. 26, 2011.

(Continued)

(51) Int. Cl.
*H04W 72/04* (2009.01)
*H04L 29/06* (2006.01)
(Continued)

(52) U.S. Cl.
CPC .......... *H04L 69/22* (2013.01); *H04L 29/0653* (2013.01); *H04L 29/12839* (2013.01);
(Continued)

(58) Field of Classification Search
None
See application file for complete search history.

(56) References Cited

U.S. PATENT DOCUMENTS

| | | | | |
|---|---|---|---|---|
| 6,356,921 B1 * | 3/2002 | Kumar | ............ | G06F 17/30905 |
| | | | | 348/E7.071 |
| 6,674,738 B1 * | 1/2004 | Yildiz | ............ | H04L 1/0045 |
| | | | | 370/338 |

(Continued)

FOREIGN PATENT DOCUMENTS

| | | |
|---|---|---|
| JP | 2004320654 A | 11/2004 |
| KR | 20100084141 A | 7/2010 |

(Continued)

OTHER PUBLICATIONS

Butti L., et al., "Discovering and exploiting 802.11 wireless driver vulnerabilities", Journal in Computer Virology, vol.4, No. 1, Sep. 29, 2007 (Sep. 29. 2007), pp. 25-37, XP002665765. Retrieved from the Internet: URL:http://www.springerlink.com [retrieved on Dec. 13, 2011].

(Continued)

*Primary Examiner* — Huy D Vu
*Assistant Examiner* — Bao G Nguyen
(74) *Attorney, Agent, or Firm* — QUALCOMM Incorporated

(57) ABSTRACT

Certain aspects of the present disclosure provide techniques and apparatus for using different MAC addresses in frames for the same station to indicate how to process the frames. In this manner, frames for IEEE 802.11ac can carry information not present in legacy frames (e.g., frames according to IEEE 802.11a/n), but these frames may be interpreted by legacy devices in a legacy way. One example method generally includes receiving a first frame comprising an indication of a first MAC address and processing the received first frame based on the first MAC address. For certain aspects, the method further includes receiving a second frame comprising an indication of a second MAC address, wherein the second MAC address is different than the first address; and processing the received second frame (Continued)

based on the second MAC address, such that the processing of the second frame is different than the processing of the first frame.

30 Claims, 9 Drawing Sheets

Related U.S. Application Data

(60) Provisional application No. 61/388,896, filed on Oct. 1, 2010.

(51) Int. Cl.
    *H04L 29/12*     (2006.01)
    *H04W 80/02*     (2009.01)
    *H04W 8/26*     (2009.01)
    *H04W 74/08*     (2009.01)

(52) U.S. Cl.
    CPC ..... *H04L 61/6022* (2013.01); *H04W 72/0406* (2013.01); *H04W 80/02* (2013.01); *H04W 8/26* (2013.01); *H04W 74/0808* (2013.01)

(56) References Cited

U.S. PATENT DOCUMENTS

| | | | |
|---|---|---|---|
| 6,873,627 | B1 | 3/2005 | Miller et al. |
| 7,426,395 | B2 | 9/2008 | Stephens |
| 7,583,649 | B1 | 9/2009 | Bagchi |
| 8,099,096 | B2 | 1/2012 | Prakash et al. |
| 8,848,561 | B2 | 9/2014 | Siomina et al. |
| 8,861,442 | B2 | 10/2014 | Zhu et al. |
| 2002/0172186 | A1 | 11/2002 | Larsson |
| 2004/0186907 | A1 | 9/2004 | Wentink |
| 2004/0228311 | A1 | 11/2004 | Sugaya et al. |
| 2005/0089013 | A1 | 4/2005 | Okagawa et al. |
| 2005/0243843 | A1* | 11/2005 | Imamura et al. ............ 370/401 |
| 2006/0133286 | A1 | 6/2006 | Elie-Dit-Cosaque et al. |
| 2006/0165114 | A1* | 7/2006 | Diepstraten et al. ......... 370/445 |
| 2006/0194616 | A1 | 8/2006 | Willins et al. |
| 2006/0268715 | A1 | 11/2006 | Zuniga et al. |
| 2006/0268766 | A1 | 11/2006 | Rangarajan et al. |
| 2007/0110035 | A1 | 5/2007 | Bennett |
| 2007/0127428 | A1 | 6/2007 | Lee et al. |
| 2007/0189168 | A1 | 8/2007 | Yao |
| 2007/0248034 | A1 | 10/2007 | Hsu et al. |
| 2008/0056211 | A1 | 3/2008 | Kim et al. |
| 2008/0232298 | A1 | 9/2008 | Kim et al. |
| 2008/0273700 | A1* | 11/2008 | Wentink ....................... 380/270 |
| 2008/0316997 | A1 | 12/2008 | Zeng et al. |
| 2008/0317155 | A1 | 12/2008 | Orfanos et al. |
| 2009/0064244 | A1 | 3/2009 | Shin et al. |
| 2009/0290524 | A1 | 11/2009 | Seok |
| 2010/0142450 | A1 | 6/2010 | Kangude et al. |
| 2010/0248635 | A1* | 9/2010 | Zhang ................. H04B 7/0413 455/63.1 |
| 2010/0278048 | A1* | 11/2010 | Sawaguchi ......... H04L 12/4625 370/241.1 |
| 2011/0199953 | A1* | 8/2011 | Seok ...................... H04W 4/06 370/312 |
| 2011/0280232 | A1 | 11/2011 | Wu et al. |
| 2011/0292897 | A1 | 12/2011 | Wu et al. |
| 2011/0317630 | A1* | 12/2011 | Zhu et al. .................... 370/329 |
| 2012/0076073 | A1 | 3/2012 | Merlin et al. |
| 2012/0087358 | A1* | 4/2012 | Zhu .................... H04W 72/042 370/338 |
| 2012/0099450 | A1 | 4/2012 | Madan et al. |
| 2012/0250617 | A1 | 10/2012 | Wentink |
| 2013/0148517 | A1 | 6/2013 | Abraham et al. |
| 2013/0184030 | A1 | 7/2013 | Tavildar et al. |
| 2013/0195081 | A1 | 8/2013 | Merlin et al. |
| 2014/0112266 | A1 | 4/2014 | Seok |
| 2014/0204872 | A1 | 7/2014 | Yang et al. |
| 2014/0307625 | A1 | 10/2014 | Wentink |
| 2015/0117366 | A1 | 4/2015 | Stupar et al. |
| 2015/0181620 | A1 | 6/2015 | Seok |

FOREIGN PATENT DOCUMENTS

| | | |
|---|---|---|
| WO | 0122686 A1 | 3/2001 |
| WO | WO-2006106450 A1 | 10/2006 |
| WO | 2007143739 | 12/2007 |
| WO | 2010017494 A1 | 2/2010 |
| WO | WO-2013106745 A1 | 7/2013 |

OTHER PUBLICATIONS

Co-pending U.S. Appl. No. 14/525,172, filed Oct. 27, 2014.
Co-pending U.S. Appl. No. 14/525,822, filed Oct. 28, 2014.
Giladi, Ran.; "Network Processors—Architecture, Progamming, and Implementation", Jul. 16, 2008 (Jul. 16, 2008), Morgan Kaufman, ISBN: 978-0-12-370891-5, Chapter 5; Paragraph "5.4.1 Parsing"; p. 196.
Gross J, et al., "Enhancing IEEE 802.11a/n with dynamic single-user OFDM adaptation", Performance Evaluation, Amsterdam, NL, vol. 66, No. 3-5, Mar. 1, 2009 (Mar. 1, 2009), pp. 240-257, XP025923721.
IEEE 802.11; Part 11: Wireless LAN Medium Access Control (MAC) and Physical Layer (PHY) Specifications (Revision of IEEE STD 802.11-1999) (2007); pp. 1-914.
IEEE P802.11ac/D0.1, Draft Standard for Information Technology—Telecommunications and information exchange between systems—Local and metropolitan area networks—Specific requirements Part 11: Wireless LAN Medium Access Control (MAC) and Physical Layer (PHY) specifications. Amendment 5: Enhancements for Very High Throughput for Operation in Bands below 6 GHz, Jan. 2011, pp. 1-193.
"IEEE Standard for Information Technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE Standard, IEEE, Piscataway, NJ, USA, Oct. 29, 2009 (Oct. 29, 2009), pp. 1-502, XP017604244, ISBN: 978-0-7381-6046-7.
IEEE standards association, "Use of the IEEE assigned Organizationally Unique Identifier with ANSI/IEEE Std 802-2001 Local and Metropolitan Area Networks", Nov. 2, 2001, ANSI/IEEE STD 802-2001 Local and Metropolitan Area Networks Tutorial Rev.Nov. 2; 3 pages.
International Search Report and Written Opinion—PCT/US2011/053762—ISA/EPO—dated Mar. 9, 2012
Jeong, K., et al., "Overlay Transmission System on Wireless LAN with RTS/CTS Exchange Taking into Account Timing Synchronization", IEICE Transactions on Communications, Communications Society, Tokyo, JP, vol. E93B, No. 3, Mar. 1, 2010 (Mar. 1, 2010), pp. 640-649, XP001555317, ISSN: 0916-8516, DOI: 10.1587/TRANSCOM.E93.B.640.
Kamath, Vasudev: "Parsing the captured packets: Packet Sniffer", Apr. 29, 2009 (Apr. 29, 2009), [retrieved on Nov. 29, 2012]; 2 pages.
Kim J., et al., "GroupID Concept for Downlink MU-MIMO Transmission", IEEE 802.11-10/0073r2, IEEE mentor, Mar. 2010 Slide Show; pp. 1-10.
Morioka Y., et al., "Why we need Length Field in VHT SIG", IEEE 802.11-10/0627r00, IEEE mentor, pp. 1-12, May 17, 2010.
Sampath H., et al: "802.11 ac Preamble", Internet Citation, Jul. 13, 2010 (Jul. 13, 2010), pp. 1-18, XP002657958, Retrieved from the Internet: URL:https://mentor.ieee.org/802.11 /dcn/10/11-10-0876-00-00ac-11 ac-preamble. pptx [retrieved on Aug. 31, 2011].
Taiwan Search Report—TW100135323—TIPO—dated Jan. 12, 2014.
Ting, et al., "Design and Analysis of Grouping-Based DCF (GB-DCF) Scheme for the MAC layer Enhancement of 802.11 and 802.11n," Proceedings of the 9th ACM international symposium on Modeling analysis and simulation of wireless and mobile systems, 2006, pp. 255-264.

(56) References Cited

OTHER PUBLICATIONS

Van Nee, R., "Breaking the Gigabit-per-second barrier with 802.11AC", IEEE Wireless Communications, IEEE Service Center, Piscataway, NJ, US, vol. 18, No. 2, Apr. 1, 2011 (Apr. 1, 2011), p. 4, XP011354039. ISSN: 1536-1284, DOI: 10.1109/MWC.2011. 5751287 p. 4, left-hand column, paragraph 1—right-hand column, paragraph 5.
Yun J-H., et al., "New Hidden Station Detection Scheme for Adaptive RTS/CTS Exchange in IEEE 802.11 WLANS", IEICE Transactions on Communications, Communications Society, Tokyo, JP, vol. E90B, No. 10, Oct. 1, 2007 (Oct. 1, 2007), pp. 2827-2835, XP001508611, ISSN:. 0916-8516,. DOI: 10.1093/IETC0M/E90-B. 10.2827.
Zhang H et al., "802.11ac Preamble", IEEE 802.11-10/0070R0, [Online] Jan. 18, 2010 (Jan. 18, 2010), pp. 1-11, XP002610760, Retrieved from the Internet: URL:https://mentor.ieee.org/802.11/dcn/10/11-10-0359-00-00ac-802-11ac-preambie.ppt> [retrieved on Nov, 22, 2010].
Asterjadhi A (Qualcomm Inc): "CC9-Resolution-CIDs-15+59+168; 11-13-0815-01-00ah-cc9-resolution-cids-15-59-168" IEEE SA Mentor; 11-13-0815-01-00AH-CC9-Resolution-CIDS-15-59-168, IEEE-SA Mentor, Piscataway, NJ USA, vol. 802.11ah, No. 1, Jul. 18, 2013 (Jul. 18, 2013), pp. 1-4, XP068054437, [retrieved on Jul. 18, 2013] paragraph [9.3.2.4].
Ghosh C (Nokia): "CC9-cluase-8-4-2-170b-conment-resolution 11-13-0813-00-00ah-cc9-cluase-8-4-2-170b-comment-resolution", IEEE SA Mentor; 11-13-0813-00-00AH-CC9-CLUASE-8-4-2-170B-Comment-Resolution, IEEE-SA Mentor, Piscataway, NJ USA, vol. 802.11ah, Jul. 15, 2013 (Jul. 15, 2013), pp. 1-22, XP068054432, [retrieved on Jul. 15, 2013] pp. 6,7 pp. 18,19.
Gong, et al., "Directional CSMA/CA protocol with spatial reuse for mmWave wireless networks," IEEE Global Telecommunications Conference (GLOBECOM), Dec. 2010, pp. 1-5.
Hart B., et al., "GAPA—Efficient, More Reliable Multicast," IEEE 802.11-08/0533r1, IEEE mentor May 12, 2008, pp. 1-13.
International Search Report and Written Opinion—PCT/US2014/062567—ISA/EPO—dated Jan. 29, 2015.
Kim J., et al., "GroupID Concept for Downlink MU-MIMO Transmission", IEEE 802.11-10/0073R1, [Online] Jan. 19, 2010, pp. 1-8.
Nishide K., et al., "Transport-level fairness provisioning in wireless local area networks with hidden stations", IEEE 20th International Symposium on Personal, Indoor and Mobile Radio Communications (PIMRC 2009), IEEE, Piscataway, NJ, USA, Sep. 13, 2009 (Sep. 13, 2009), pp. 1158-1162, XP031659609, ISBN: 978-1-4244-5122-7 paragraphs [III.B]—[OOC.] figures 2,3,5.
Park J., et al., "802.11ac MAC Frame Length Indication," IEEE 802.11-10/0358r0, IEEE mentor Mar. 16, 2010, pp. 1-10.
European Search Report—EP16172715—Search Authority—The Hague—dated Aug. 1, 2016.
Fischer M., et al., "Inter-bss-address-3-contents", IEEE 802.11-09/0401r2, IEEE mentor, Mar. 2009, 6 pages.
Ponnampalam V., et al., "11 ac Auto-detection using the VHT-SIGA Field", IEEE 802.11-10/0750r1, IEEE mentor, Jul. 2010, 15 pages.
Taiwan Search Report—TW103145526—TIPO—dated Feb. 18, 2016.

\* cited by examiner

LEGACY-COMPATIBLE CONTROL FRAMES

CROSS-REFERENCE TO RELATED APPLICATIONS

This application is a Continuation of U.S. Utility application Ser. No. 14/316,734, filed Jun. 26, 2014, which is a continuation of U.S. Utility application Ser. No. 13/245,555, filed Sep. 26, 2011, which claims benefit of U.S. Provisional Patent Application Ser. No. 61/388,896, filed Oct. 1, 2010, which is herein incorporated by reference in its entirety.

BACKGROUND

Field

Certain aspects of the present disclosure generally relate to wireless communications and, more particularly, to using different Media Access Control (MAC) addresses in frames for the same apparatus (e.g., a user terminal) to indicate how to process the frames.

Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure generally relate to using different Media Access Control (MAC) addresses in frames for the same apparatus (e.g., a user terminal) to indicate how to process (e.g., interpret and parse) the frames. In this manner, frames for IEEE 802.11ac can carry information not present in legacy frames (e.g., frames in accordance with amendments to the IEEE 802.11 standard prior to 802.11ac, such as IEEE 802.11a or 802.11n), but these frames may be interpreted by legacy devices in a legacy way.

Certain aspects of the present disclosure provide a method for wireless communications. The method generally includes receiving, at an apparatus, a first frame comprising an indication of a first MAC address and parsing the received first frame based on the first MAC address.

Certain aspects of the present disclosure provide an apparatus for wireless communications. The apparatus generally includes a receiver configured to receive a first frame comprising an indication of a first MAC address and a processing system configured to parse the received first frame based on the first MAC address.

Certain aspects of the present disclosure provide an apparatus for wireless communications. The apparatus generally includes means for receiving a first frame comprising an indication of a first MAC address and means for parsing the received first frame based on the first MAC address.

Certain aspects of the present disclosure provide a computer-program product for wireless communications. The computer-program product generally includes a computer-readable medium having instructions executable to receive, at an apparatus, a frame comprising an indication of a MAC address and to parse the received frame based on the MAC address.

Certain aspects of the present disclosure provide a wireless node. The wireless node generally includes at least one antenna; a receiver configured to receive, via the at least one antenna, a frame comprising an indication of a MAC address; and a processing system configured to parse the received frame based on the MAC address.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
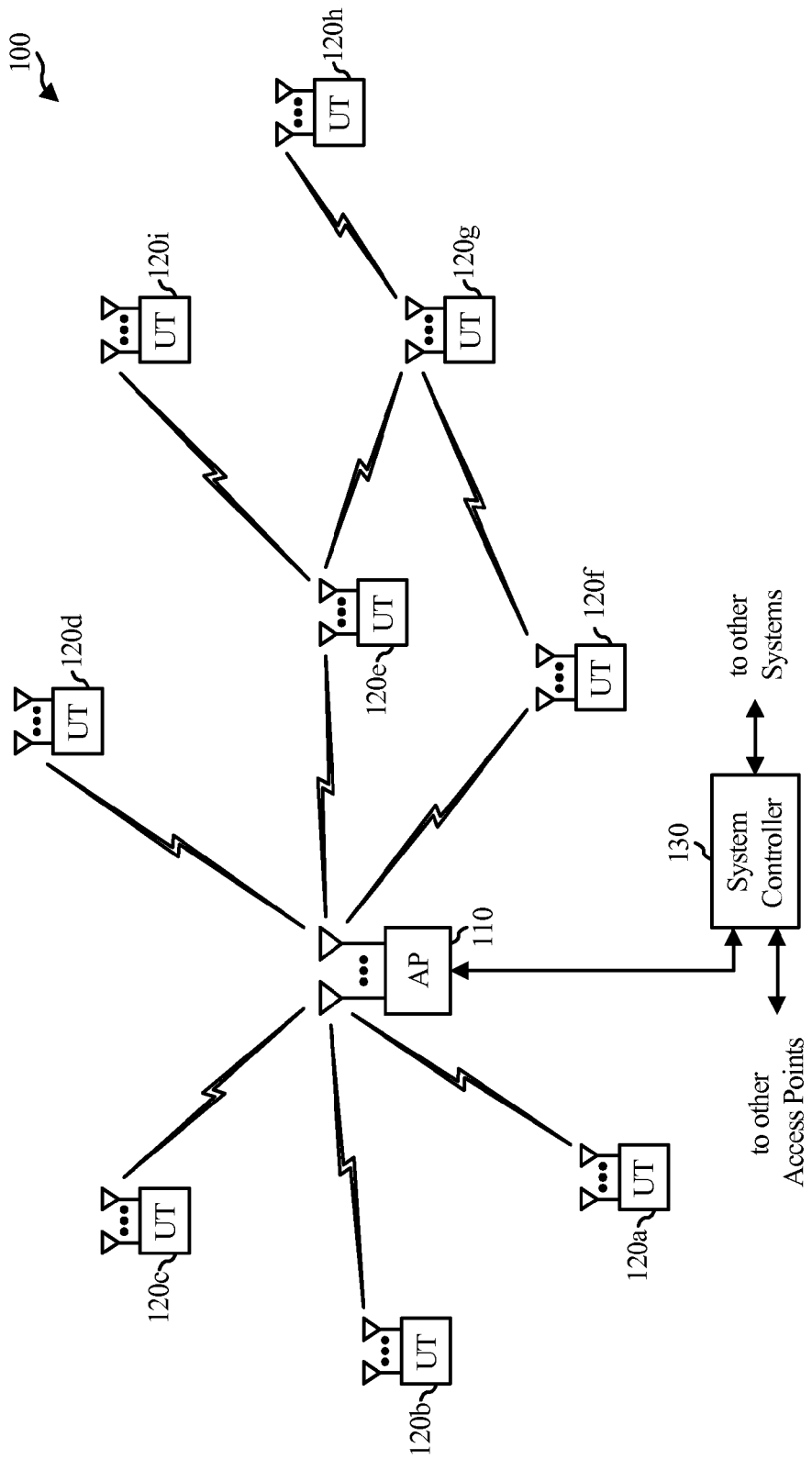
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a station (STA), a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a tablet, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to a different user terminal 120.

Figure 2:
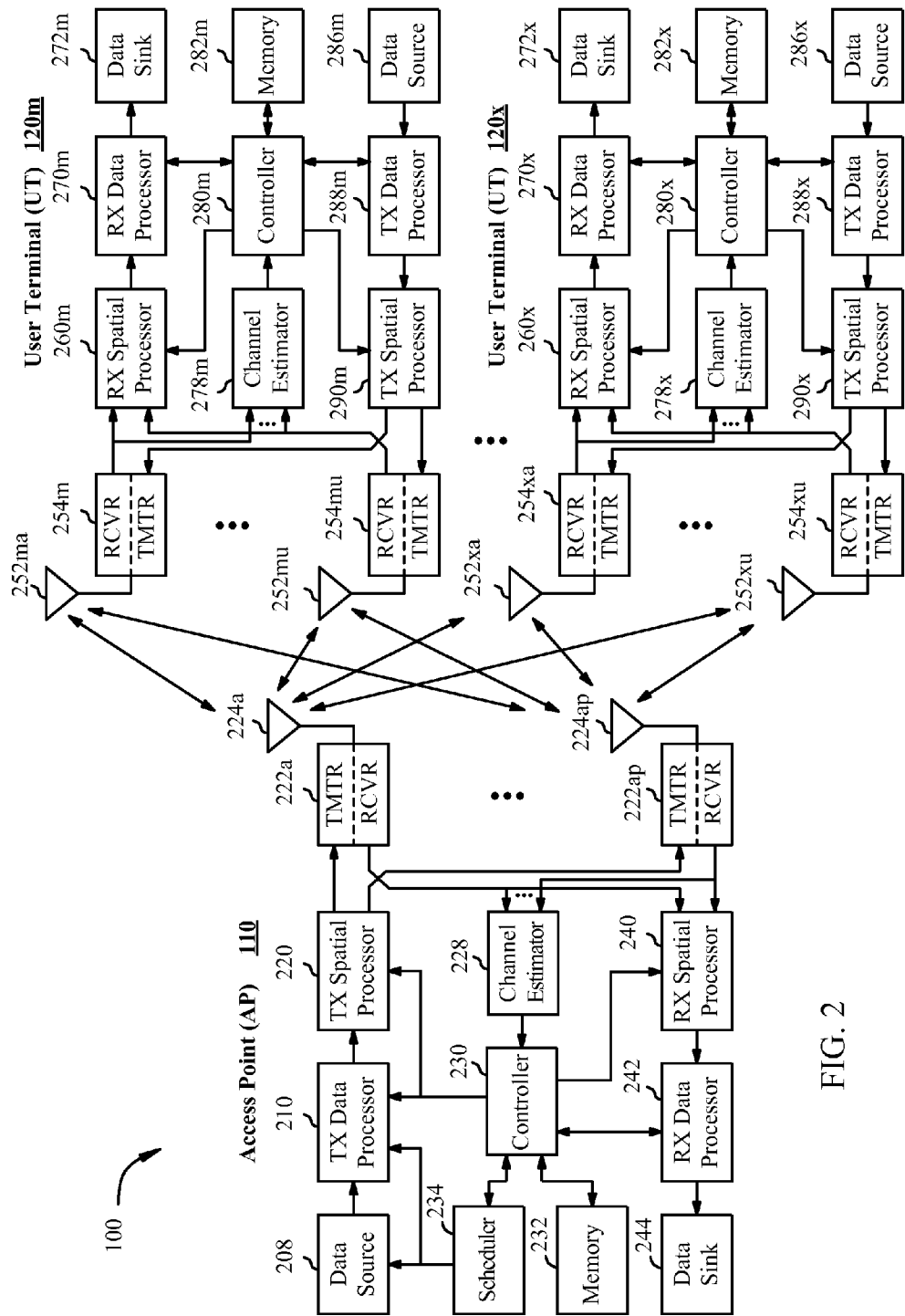
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
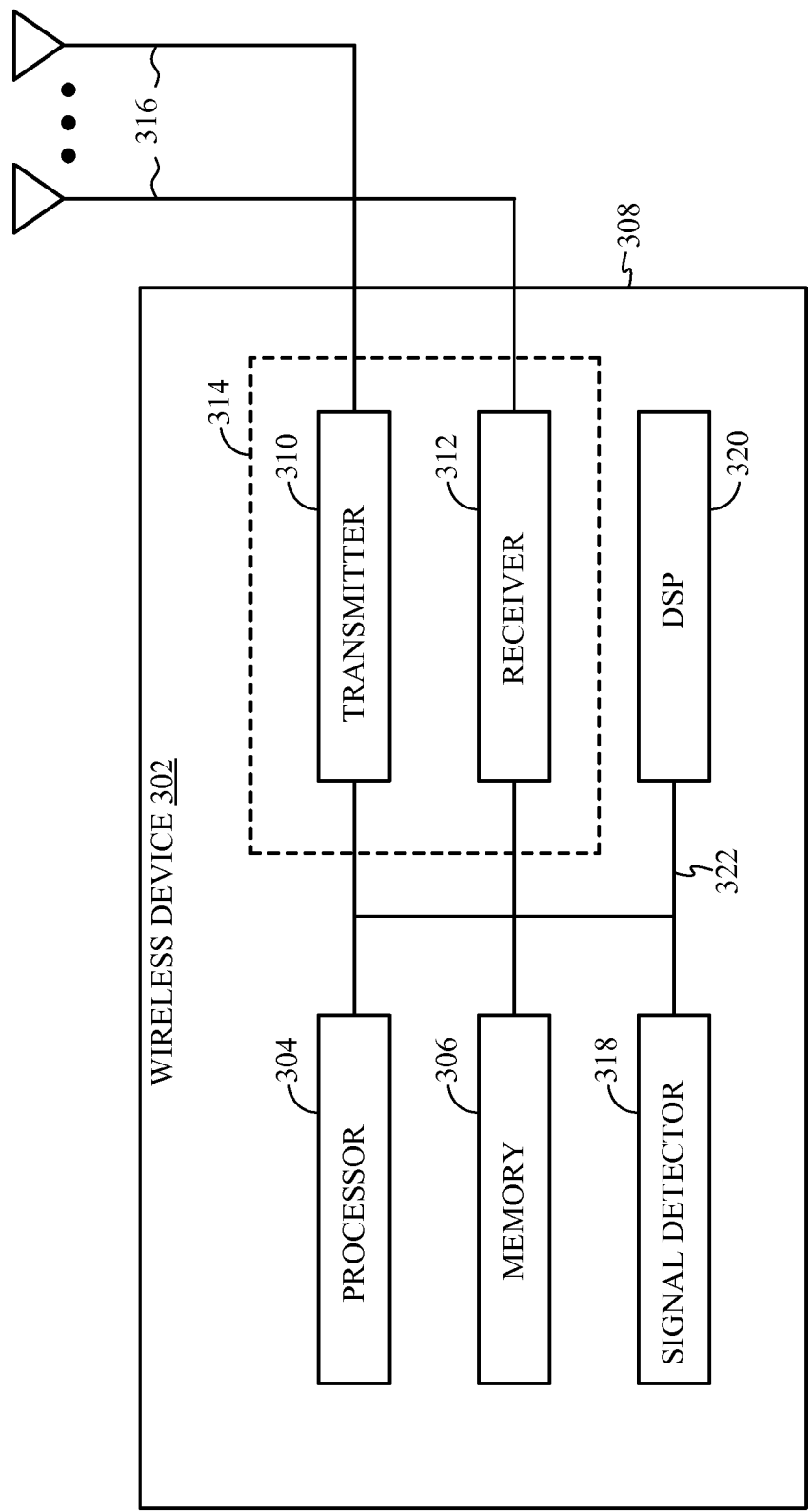
FIG. 3 illustrates a block diagram of an example wireless device in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Frame Structures

Figure 4:
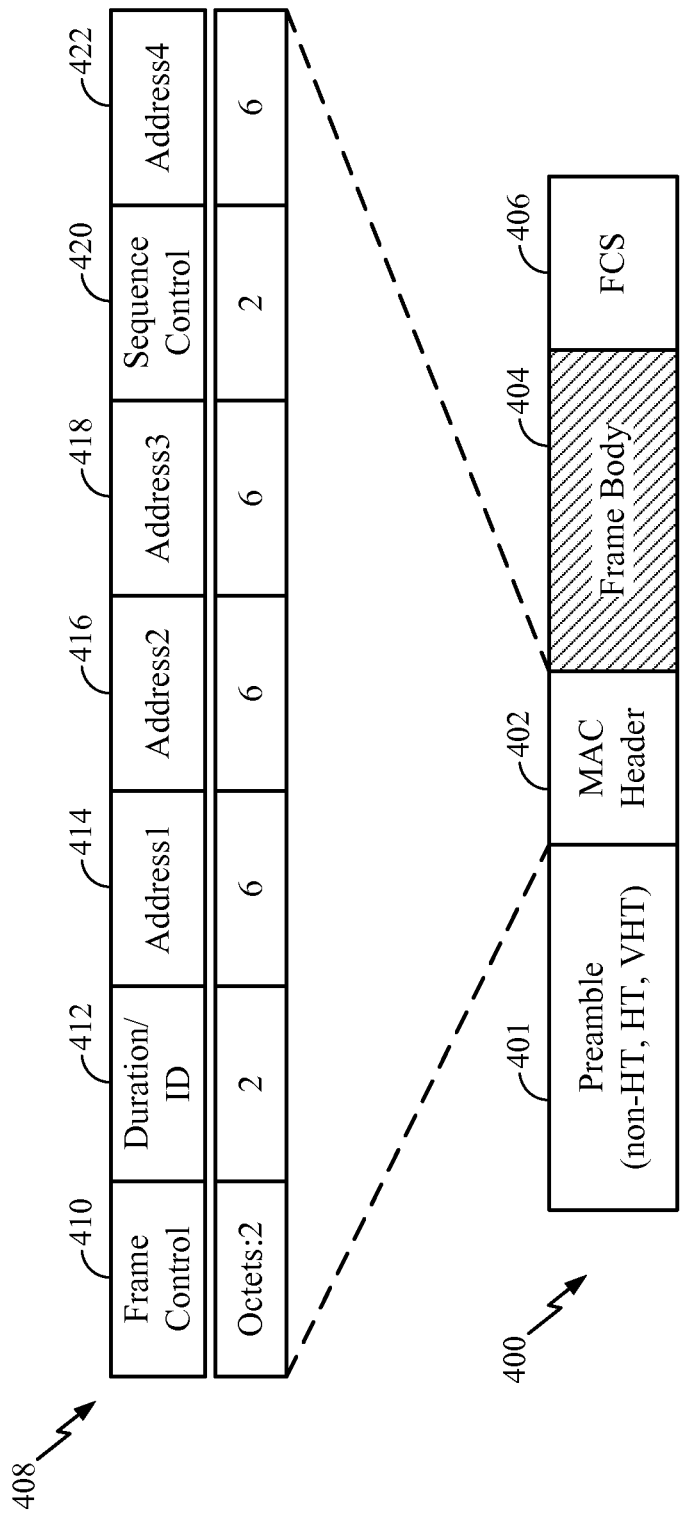
FIG. 4 illustrates an example frame structure for wireless communications in accordance with certain aspects of the present disclosure.

In order to communicate, the access point (AP) 110 and the user terminals 120 in a wireless network (e.g., system 100 illustrated in FIG. 1) may exchange messages according to certain frame structures. FIG. 4 illustrates an example frame structure 400 for wireless communications in accordance with certain aspects of the present disclosure. The frame structure 400 may comprise a preamble 401, a Media Access Control (MAC) header 402, a frame body 404, and a frame check sequence (FCS) 406. The frame structure 400 may be used for control frames, data frames, and management frames according to the IEEE 802.11 standard, although control frames may not include a frame body.

FIG. 4 also illustrates a general frame format 408 for the MAC header 402. The general frame format 408, which is also the same as the data frame format, may comprise 30 octets broken down as follows: two octets for a frame control (FC) field 410, two octets for a Duration/ID field 412, six octets for an Address1 field 414, six octets for an Address2 field 416, six octets for an Address3 field 418, two octets for a Sequence Control field 420, and six octets for an Address4 field 422. The four address fields 414, 416, 418, 422 may comprise a Source Address (SA), a Destination Address (DA), or additional addresses—such as a Transmitter Address (TA), a Receiver Address (RA), or a Basic Service Set Identifier (BSSID)—used to filter multicast frames to allow transparent mobility in IEEE 802.11. These addresses may be MAC addresses of various network devices, such as a user terminal 120 or an access point 110.

Figure 5A:
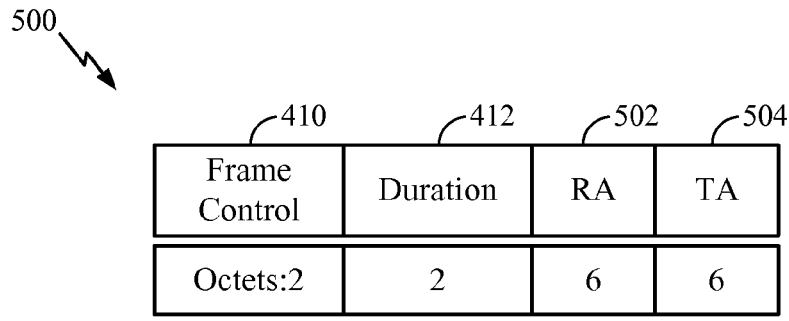
FIGS. 5A-5C illustrate example frame formats, for control and management frames, for the Media Access Control (MAC) header in the frame structure of FIG. 4, in accordance with certain aspects of the present disclosure.

FIG. 5A illustrates an example frame format 500 for a short control frame, such as a Request to Send (RTS) frame. This control frame format 500 may include the FC field 410, the Duration field 412, an RA field 502, and a TA field 504. As defined herein, the RA generally refers to the MAC address to which the frame is sent over the wireless medium. The RA may be an individual or a group address. The TA, as defined herein, generally refers to the MAC address of the station that transmitted the frame to the wireless medium.

Figure 5B:
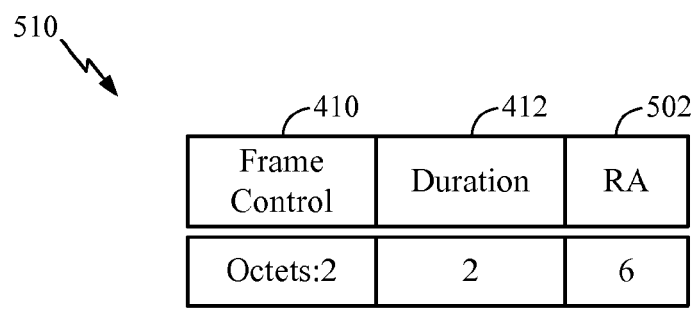

FIG. 5B illustrates another example frame format 510 for a short control frame, such as a Clear to Send (CTS) frame or an acknowledgment (ACK) frame. This control frame format 510 is similar to the control frame format 500 in FIG. 5A, but without the TA field 504.

Figure 5C:
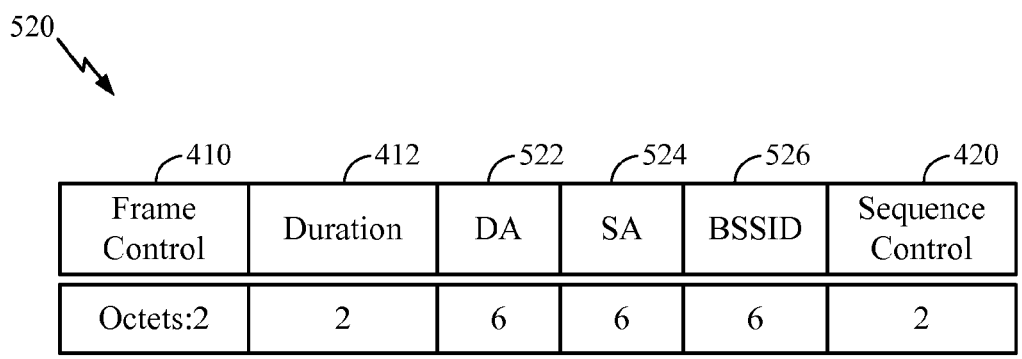

FIG. 5C illustrates a management frame format 520. In addition to the FC field 410 and the Duration field 412, the management frame format 520 may include a DA field 522, an SA field 524, a BSSID field 526, and a Sequence Control field 420.

Figure 6A:
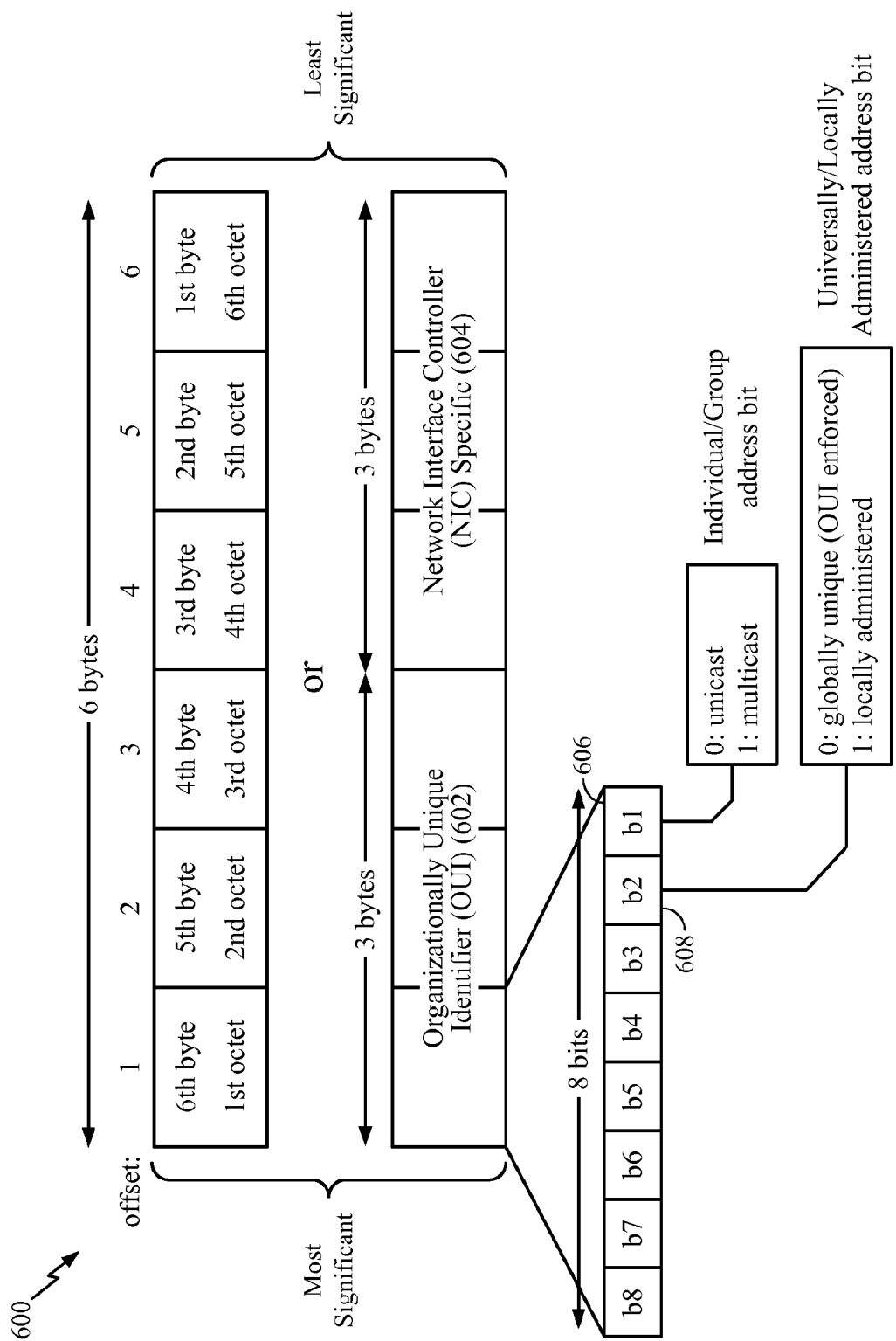
FIG. 6A illustrates an example MAC address structure, in accordance with certain aspects of the present disclosure.

FIG. 6A illustrates an example MAC address structure 600. The MAC address may comprise 6 octets (48 bits), where the first three octets may identify the organization that issued the MAC address and are known as the Organizationally Unique Identifier (OUI) 602. The second three octets 604 are Network Interface Controller (NIC)-specific and may be assigned by the issuing organization in nearly any manner, subject to the constraint of uniqueness.

In the MAC address structure 600, the least significant bit (LSB) of the most significant octet may be considered as the Individual/Group (I/G) address bit 606. The next LSB of this octet may be considered as the Universally/Locally Administered address bit 608.

Figure 6B:
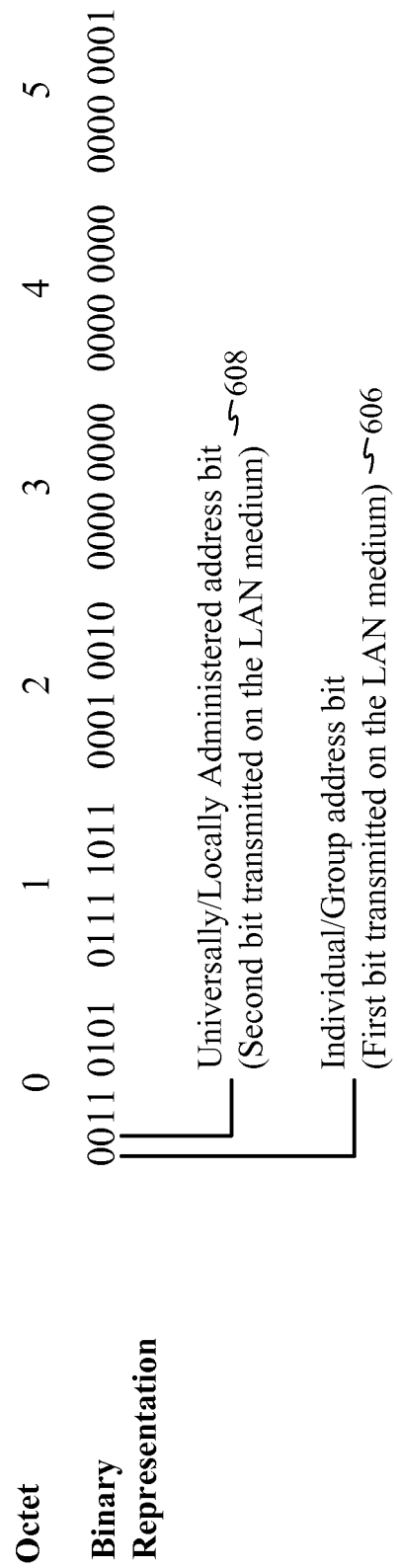
FIG. 6B illustrates an example MAC address in canonical form with the least significant bit (LSB) in each byte transmitted first, in accordance with certain aspects of the present disclosure.

FIG. 6B illustrates an example MAC address AC-DE-48-00-00-80 (in hexadecimal) in canonical form with the LSB in each byte transmitted first. With this transmission order, the I/G address bit 606 and the U/L Administered address bit are the first and second bits, respectively, transmitted in a wireless medium.

Example Legacy-Compatible Frames

IEEE 802.11ac is an amendment to the IEEE 802.11 standard that enables higher throughput in 802.11 networks.

The higher throughput is realized through several measures, such as the use of MU-MIMO (multiuser multiple input multiple output) and 80 MHz or 160 MHz channel bandwidth. IEEE 802.11 ac is also referred to as Very High Throughput (VHT).

New VHT-capable devices may employ control frames with additional or different VHT-specific information. However, legacy devices (i.e., devices supporting earlier amendments to the IEEE 802.11 standard, such as 802.11a and 802.11n) may not be able to interpret certain VHT control frames.

Accordingly what is needed are techniques and apparatus for defining control frames for IEEE 802.11ac which can carry information that is not present in legacy control frames, yet the VHT control frames may be interpreted by legacy devices in a legacy manner.

Figure 7:
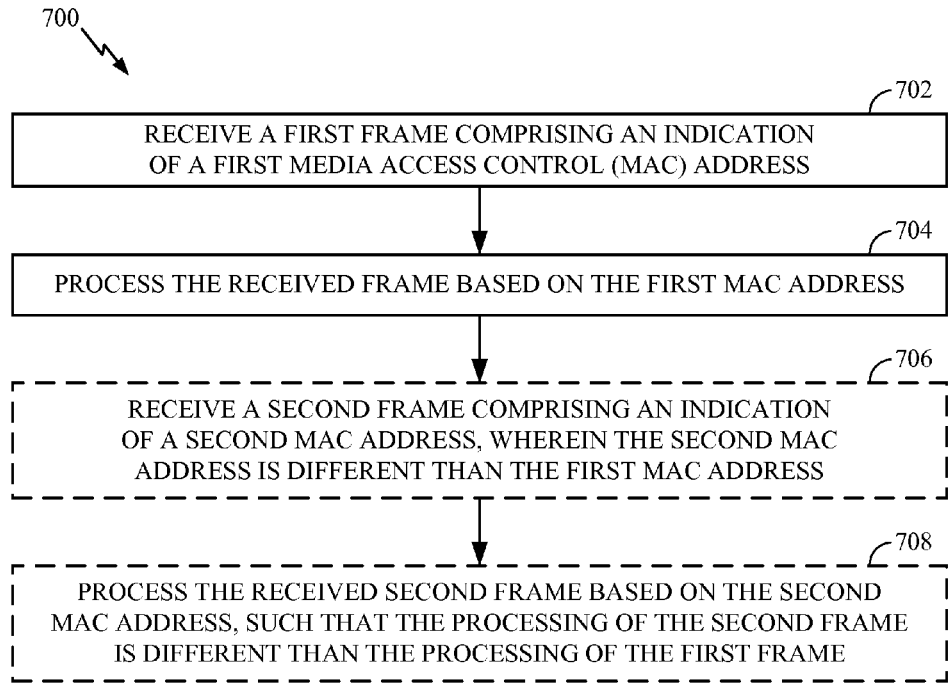
FIG. 7 illustrates example operations to process, from the perspective of a receiving entity, a received frame based on the MAC address of the frame, in accordance with certain aspects of the present disclosure.

FIG. 7 illustrates example operations 700 to process, from the perspective of a receiving entity (e.g., a user terminal 120 or access point 110), a received frame based on the MAC address of the frame. The operations 700 may begin, at 702, by receiving a first frame comprising an indication of a first MAC address. At 704, the receiving entity may process (e.g., interpret and/or parse) the received frame based on the first MAC address.

Processing the received first frame may involve interpreting the first frame as a legacy frame or as a Very High Throughput (VHT) frame, according to the first MAC address. As used herein, "a legacy frame" generally refers to a frame in accordance with an amendment of the IEEE 802.11 standard prior to the 802.11ac amendment, whereas "a VHT frame" generally refers to a frame in accordance with the 802.11ac amendment (or subsequent amendments) to the IEEE 802.11 standard.

For certain aspects, the receiving entity may receive a second frame comprising an indication of a second MAC address at 706, wherein the second MAC address is different than the first MAC address. At 708, the receiving entity may process the received second frame based on the second MAC address, such that the processing of the second frame is different than the processing of the first frame. For certain aspects, the receiving entity may receive a management frame signaling the first MAC address (i.e., notifying the receiving entity that frames comprising the indication of the first MAC address are intended for the receiving entity), such that the receiving entity will know to process frames received with the first MAC address differently than frames received with the second MAC address.

Certain aspects of the present disclosure involve transmitting new 802.11ac-specific control frames to a second MAC address that is associated with the same device. Frames that are received with the first MAC address of the device may be processed as a typical legacy frame would be, such as according to the 802.11a amendment or the 802.11n amendment to the IEEE 802.11 standard. Frames that are received with the second MAC address, however, may be processed according to different rules as defined in 802.11ac (or later amendments to the IEEE 802.11 standard).

The second MAC address may be transmitted in the RA field 502 of a control frame, such as a Request to Send (RTS) frame, a Clear to Send (CTS) frame, or an acknowledgment (ACK) frame. The second MAC address may also be transmitted in the DA field 522 of a management frame or in one of the address fields (e.g., the Address1 field 414 or the Address3 field 418) of a data frame.

For certain aspects, the second MAC address may be a second unique global MAC address that is associated with the device.

For other aspects, the first and second MAC addresses may be nearly the same, differing by only one or two bits, for example. For example, the second MAC address may be formed by setting the Individual/Group (I/G) address bit 606 of the first MAC address to 1, so that the second MAC address is the group address version of the first MAC address. In other words, the I/G address bit 606 of the first MAC address is a 0. In this manner, the first MAC address differs from the second MAC address by only one address bit. As another example, the second MAC address may be formed by setting the Universally/Locally (U/L) Administered address bit 608 of the first MAC address to 1, so that the second MAC address is the locally administered version of the first MAC address. For certain aspects, these two ideas may be combined. For example, the second MAC address may be formed by setting the I/G address bit 606 of the first MAC address to 1 and setting the U/L Administered address bit 608 of the first MAC address to 1, so that the second MAC address is the locally administered group address version of the first MAC address.

For certain aspects, the second MAC address may be formed by flipping the least significant address bit, which means that the device has two globally administered MAC addresses since the U/L Administered address bit 608 may not be changed with this method. For other aspects, the second MAC address may be formed by setting the least significant address bit to 1, with the convention that the first MAC address always has a least significant bit set to 0. As an alternative, the second MAC address may be formed by setting the least significant address bit to 0, with the convention that the first MAC address always has a least significant bit set to 1.

In addition to the above-mentioned address bits, the second MAC address may be formed by flipping a predetermined address bit of the first MAC address. For other aspects, the second MAC address may be formed by setting a predetermined address bit of the first MAC address to 1, with the convention that the predetermined address bit is always 0 in the first MAC address. As an alternative, the second MAC address may be formed by setting a predetermined address bit of the first MAC address to 0, with the convention that the predetermined address bit is always 1 in the first MAC address.

For certain aspects, the second MAC address may be signaled in a management frame. The second MAC address may be included in the management frame as an information element (IE). By sending a management frame with the second MAC address, the second MAC address need not be related to the first MAC address.

In operation, a transmitting entity may send a frame to the second MAC address of the intended receiving entity to indicate that additional information is hidden in the frame, or to indicate that the frame should be parsed or otherwise processed in a different way. The receiving entity may parse or otherwise process a frame received with the second MAC address differently from a frame received with the first MAC address, even though both MAC addresses belong to the receiving entity.

The first MAC address may be the address that is provided for address resolution purposes (i.e., when the address is requested for using the Address Resolution Protocol (ARP)). For certain aspects, the first MAC address may be used with data frames, while the second MAC address may be used with control frames, such as an RTS frame, a CTS frame, or an ACK frame. The first MAC address may be used as the Source Address (SA) for any transmission. The second MAC address may be derived from the first MAC address through a defined rule (e.g., setting a predetermined address bit of the first MAC address to 1), or the second MAC address may be communicated explicitly in a management frame, both as described above.

For certain aspects, the information transmitted in a VHT-specific control frame (e.g., an RTS or CTS frame) may include information about the channels on which the control frame was transmitted or on which channels a control frame was received. In IEEE 802.11ac networks, the basic channel unit is 20 MHz wide. Each PPDU (physical layer conversion protocol (PLCP) protocol data unit) may span 20, 40, 80, or 160 MHz (i.e., one, two, four, or eight 20 MHz channels). For certain aspects, this bandwidth information may be encoded in two or more bits, (e.g., two or more LSBs) of the Duration field of the MAC header.

Exemplary frame exchanges between a STA A and a STA B using legacy-compatible frames are illustrated in FIGS. 8-11. In these figures, "A1" represents the first MAC address of STA A, "A2" represents the second MAC address of STA A, "B1" represents the first MAC address of STA B, and "B2" represents the second MAC address of STA B.

Figure 8:
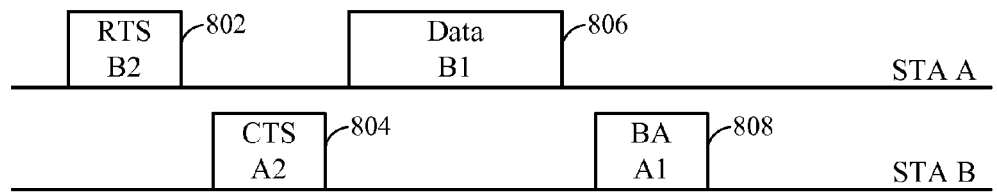
FIGS. 8-11 illustrate example frame exchanges between two wireless devices using legacy-compatible control frames, in accordance with certain aspects of the present disclosure.

FIG. 8 illustrates an RTS frame 802 transmitted by STA A to the second MAC address B2 of STA B as the intended recipient. The RTS frame 802 may include information that is not present in legacy RTS frames, such as VHT-specific information. STA B may parse the received RTS frame 802 in a different manner from typical parsing for legacy RTS frames to extract this information.

In response to receiving the RTS frame 802, STA B may transmit a CTS frame 804 to the second MAC address of STA A as the intended recipient. The CTS frame 804 may also include information that is not present in legacy CTS frames, such as VHT-specific information.

Upon receiving the CTS frame 804, STA A may transmit a data frame 806 with the first MAC address, indicating that the data frame should be parsed by STA B in the same manner as typical parsing for legacy data frames. To acknowledge receipt of the data frame 806, STA B may transmit an ACK frame 808, such as a block acknowledgment (BA), to the first MAC address of STA A as the intended recipient.

Figure 9:
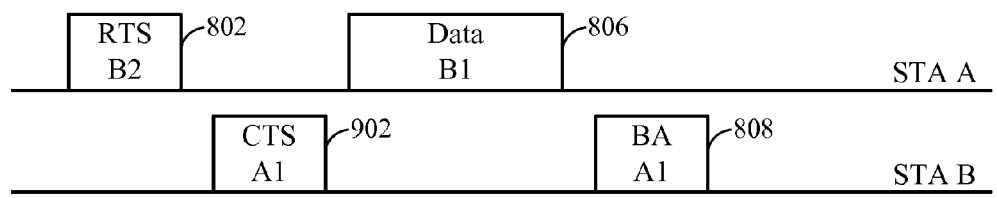

FIG. 9 illustrates an RTS frame 802 transmitted by STA A to the second MAC address B2 of STA B, followed by a CTS frame 902 transmitted by STA B to the first MAC address A1 of STA A. Unlike the CTS frame 804 in FIG. 8, the CTS frame 902 in FIG. 9 may only include information that is present for legacy CTS frames. This RTS/CTS exchange may be followed by a data/ACK exchange between the first MAC addresses of STA A and STA B as described above for FIG. 8.

Figure 10:
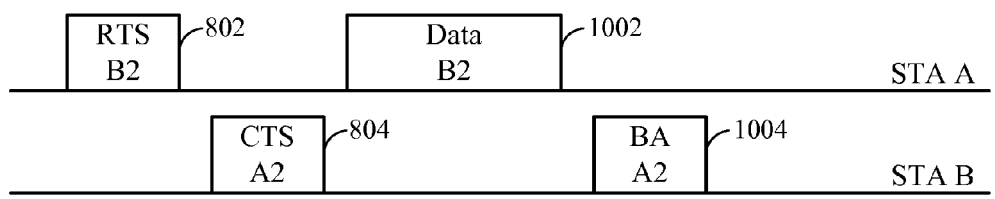

FIG. 10 illustrates an RTS/CTS exchange between the second MAC addresses as described above for FIG. 8. This may be followed by STA A transmitting a data frame 1002 to the second MAC address of STA B, indicating that the data frame includes information not present in legacy data frames. In response to receiving the data frame 1002, STA B may parse the data frame 1002 to extract the data including the new information and may then transmit an ACK frame 1004 to the second MAC address of STA A, indicating that the ACK frame 1004 includes information not present in legacy ACK frames.

Figure 11:
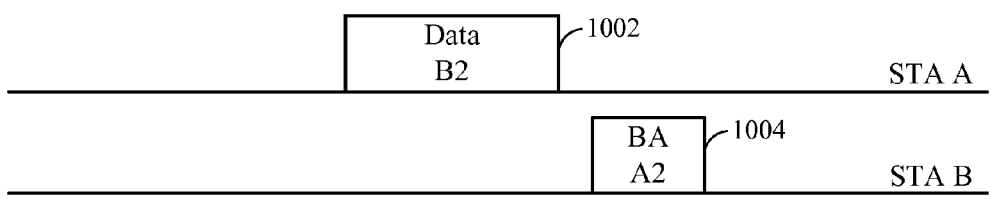

FIG. 11 illustrates a data/ACK exchange between the second MAC addresses of STA A and STA B as described above for FIG. 10. In this scenario, an RTS/CTS exchange need not be performed prior to the data/ACK exchange.

In an example transmitter scenario, a data frame may be sent to a specific Receiver Address (RA). The MAC layer may determine that the transmission should be preceded by an RTS frame, that the device with the RA is 802.11ac-capable, and that 802.11ac-specific information will be included in the RTS frame. The MAC layer may form the 802.11ac-specific RTS frame and include the second MAC address of the intended receiver. The second MAC address may be formed by flipping a specific bit in the intended receiver's first MAC address.

In an example receiver scenario, a STA may receive an RTS frame that is addressed to the second MAC address of the STA. The STA may then parse the received RTS as being 802.11ac-specific. For example, the RTS frame may include information about the channels on which the RTS frame was transmitted.

Figure 7A:
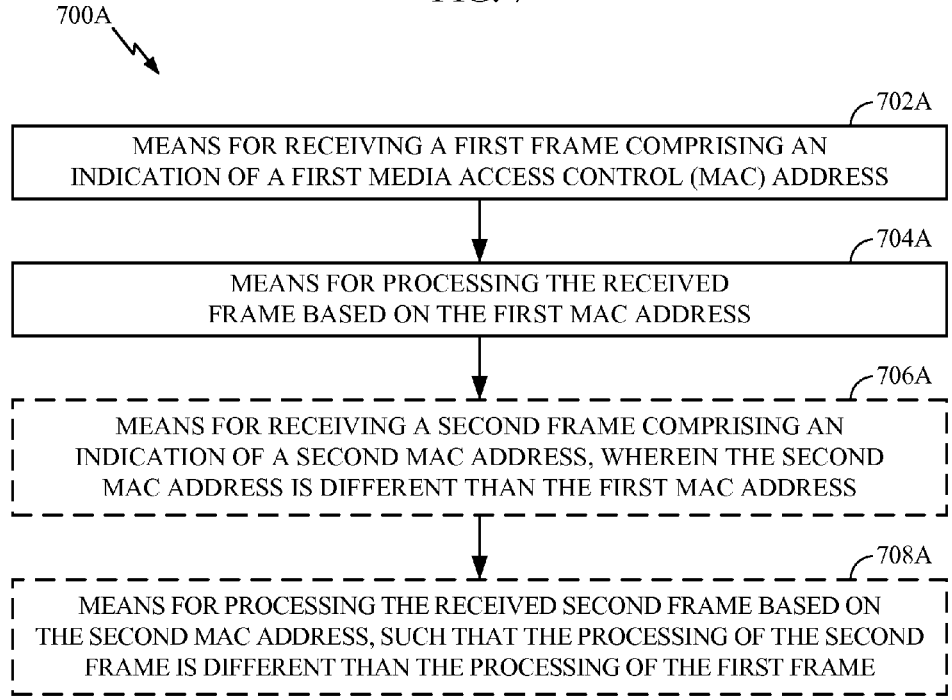
FIG. 7A illustrates example means for performing the operations shown in FIG. 7.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 700 illustrated in FIG. 7 correspond to means 700A illustrated in FIG. 7A.

For example, the means for transmitting may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. The means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. The means for processing may comprise a processing system, which may include one or more processors, such as the RX data processor 270 and/or the controller 280 of the user terminal 120 or the RX data processor 242 and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 110 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a receiver configured to:
receive a first frame comprising an indication of a first Media Access Control (MAC) address associated with a device, and
receive a second frame comprising an indication of a second MAC address associated with the device, wherein the second MAC address is different than the first MAC address; and
a processing system configured to:
determine to parse the first frame by interpreting the first frame as a legacy frame based on the first MAC address;
parse the first frame as a legacy frame based on the determination to parse the first frame;
determine to parse the second frame by interpreting the second frame as a very high throughput (VHT) frame based on the second MAC address; and
parse the second frame as a VHT frame, based on the determination to parse the second frame, such that parsing of the second frame is different than parsing of the first frame.

2. The apparatus of claim 1, wherein the processing system is configured to parse the second frame by extracting, from the second frame, information supported by the Institute of Electrical and Electronics Engineers (IEEE) 802.11ac amendment or amendments to the IEEE 802.11 standard made after the IEEE 802.11ac amendment, based on the determination to parse the second frame.

3. The apparatus of claim 1, wherein the processing system is configured to parse the first frame by extracting, from the first frame, information about one or more channels on which the first frame was sent.

4. The apparatus of claim 3, wherein the information is indicated by two or more least significant bits (LSBs) of a field of the first frame.

5. The apparatus of claim 1, wherein the processing system is configured to parse the first frame based on the Institute of Electrical and Electronics Engineers (IEEE) 802.11a amendment or 802.11n amendment to the IEEE 802.11 standard.

6. The apparatus of claim 1, wherein the first frame comprises a control frame.

7. The apparatus of claim 6, further comprising a transmitter, wherein the control frame comprises a Request to Send (RTS) frame, wherein the transmitter is configured to transmit, to another apparatus, a Clear to Send (CTS) frame in response to the received RTS frame, and wherein the second frame comprises a data frame sent by the other apparatus in response to the CTS frame.

8. The apparatus of claim 1, wherein the first MAC address differs from the second MAC address by only one address bit.

9. The apparatus of claim 8, wherein the one address bit comprises an Individual/Group (I/G) address bit, a Universally/Locally (U/L) Administered address bit, or a least significant address bit.

10. A method for wireless communications, comprising:
receiving a first frame comprising an indication of a first Media Access Control (MAC) address associated with a device;
receiving a second frame comprising an indication of a second MAC address associated with the device, wherein the second MAC address is different than the first MAC address; and
determining to parse the first frame by interpreting the first frame as a legacy frame based on the first MAC address;
parsing the first frame as a legacy frame based on the determination to parse the first frame;
determining to parse the second frame by interpreting the second frame as a very high throughput (VHT) frame based on the second MAC address; and
parsing the second frame as a VHT frame, based on the determination to parse the second frame, such that parsing of the second frame is different than parsing of the first frame.

11. The method of claim 10, further comprising parsing the second frame by extracting, from the second frame, information supported by the Institute of Electrical and Electronics Engineers (IEEE) 802.11ac amendment or amendments to the IEEE 802.11 standard made after the IEEE 802.11ac amendment, based on the determination to parse the second frame.

12. The method of claim 10, further comprising parsing the first frame by extracting, from the first frame, information about one or more channels on which the first frame was sent.

13. The method of claim 12, wherein the information is indicated by two or more least significant bits (LSBs) of a field of the first frame.

14. The method of claim 10, further comprising parsing the first frame based on the Institute of Electrical and Electronics Engineers (IEEE) 802.11a amendment or 802.11n amendment to the IEEE 802.11 standard.

15. The method of claim 10, wherein the first frame comprises a control frame.

16. The method of claim 15, wherein:
the control frame comprises a Request to Send (RTS) frame;
the method further comprises transmitting, to another apparatus, a Clear to Send (CTS) frame in response to the received RTS frame; and
the second frame comprises a data frame sent by the other apparatus in response to the CTS frame.

17. The method of claim 10, wherein the first MAC address differs from the second MAC address by only one address bit.

18. The method of claim 17, wherein the one address bit comprises an Individual/Group (I/G) address bit, a Universally/Locally (U/L) Administered address bit, or a least significant address bit.

19. An apparatus for wireless communications, comprising:
a processing system configured to:
select a first Media Access Control (MAC) address from at least two MAC addresses associated with a single device, wherein the selection of the first MAC address indicates to a receiving device that the receiving device is to parse a first frame by interpreting the first frame as a legacy frame; and
select a second MAC address from the at least two MAC addresses associated with the single device, wherein the second MAC address is different than the first MAC address and the selection of the second MAC address indicates to the receiving device that the receiving device is to parse a second frame differently than the first frame; and
a transmitter configured to:
transmit the first frame including the first MAC address to the receiving device; and
transmit the second frame including the second MAC address to the receiving device.

20. The apparatus of claim 19, wherein the processing system is configured to provide, in the first frame, information about one or more channels on which the first frame is transmitted.

21. The apparatus of claim 19, wherein the first frame comprises a control frame.

22. The apparatus of claim 21, further comprising a receiver, wherein the control frame comprises a Request to Send (RTS) frame, wherein the receiver is configured to receive, from the device wireless node, a Clear to Send (CTS) frame in response to the RTS frame, and wherein the second frame comprises a data frame transmitted in response to the CTS frame.

23. The apparatus of claim 19, wherein the first MAC address differs from the second MAC address by only one address bit.

24. The apparatus of claim 23, wherein the one address bit comprises an Individual/Group (I/G) address bit, a Universally/Locally (U/L) Administered address bit, or a least significant address bit.

25. A method for wireless communications, comprising:
selecting a first Media Access Control (MAC) address from at least two MAC addresses associated with a single device, wherein the selection of the first MAC address indicates to a receiving device that the receiving device is to parse a first frame by interpreting the first frame as a legacy frame;
selecting a second MAC address from the at least two MAC addresses associated with the single device, wherein the second MAC address is different than the first MAC address and the selection of the second MAC address indicates to the receiving device that the receiving device is to parse a second frame differently than the first frame;
transmitting the first frame including the first MAC address to the receiving device; and
transmitting the second frame including the second MAC address to the receiving device.

26. The method of claim 25, further comprising providing, in the first frame, information about one or more channels on which the first frame is transmitted.

27. The method of claim 25, wherein the first frame comprises a control frame.

28. The method of claim 25, wherein the first MAC address differs from the second MAC address by only one address bit.

29. The method of claim 28, wherein the one address bit comprises an Individual/Group (I/G) address bit, a Universally/Locally (U/L) Administered address bit, or a least significant address bit.

30. The apparatus of claim 1, wherein the first frame and the second frame are received from a single wireless node.

* * * * *